June 19, 1928.

M. A. NOSAL

VEHICLE VENTILATOR

Filed May 28, 1927   2 Sheets-Sheet 1

1,674,373

M. A. Nosal  INVENTOR

BY *Victor J. Evans*

ATTORNEY

WITNESS:

June 19, 1928.
M. A. NOSAL
VEHICLE VENTILATOR
Filed May 28, 1927
1,674,373
2 Sheets-Sheet 2
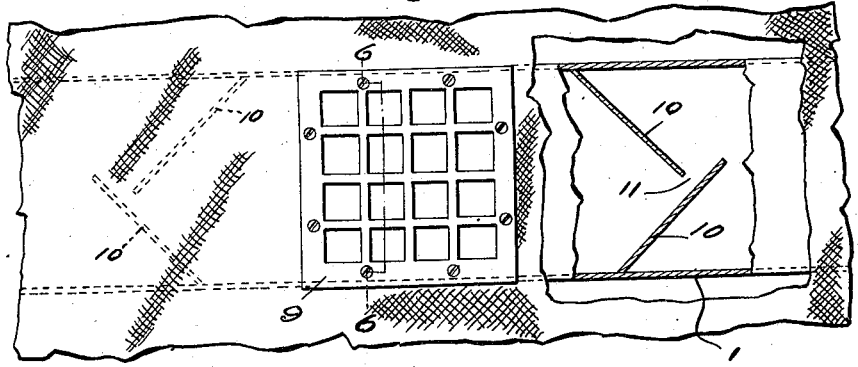
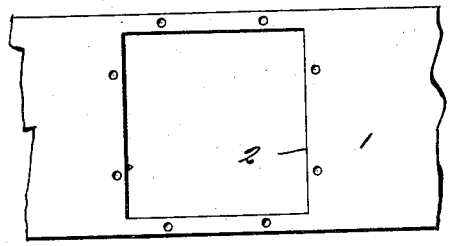
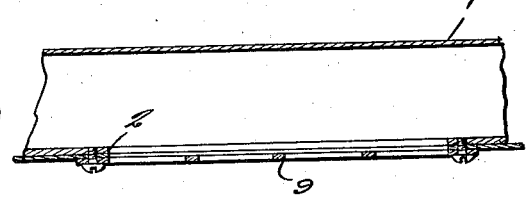
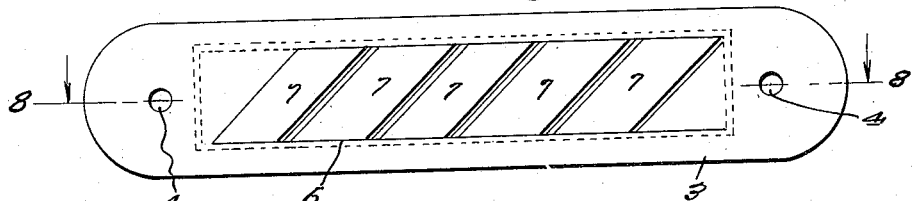
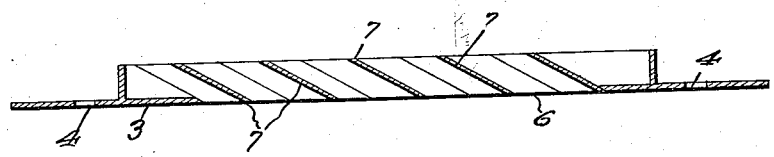
WITNESS:
R. A. Thomas
M. A. Nosal  INVENTOR
BY Victor J. Evans
ATTORNEY Patented June 19, 1928.

1,674,373

UNITED STATES PATENT OFFICE.

MICHAEL A. NOSAL, OF OMAHA, NEBRASKA.

VEHICLE VENTILATOR.

Application filed May 28, 1927. Serial No. 195,072.

This invention relates to a ventilator for a closed type of motor vehicle, the general object of the invention being to provide means whereby air in the vehicle can pass through the top thereof and escape into the atmosphere while preventing wind and rain from entering the vehicle through the ventilator.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 4 is a view of portion of the ceiling of the vehicle, showing the invention therein, parts being broken away.

Figure 5 is a view of the central part of the ventilator, showing the opening therein.

Figure 6 is a section on line 6—6 of Figure 4.

Figure 7 is a view of one of the end members of the ventilator.

Figure 8 is a section on line 8—8 of Figure 7.

Figure 1:
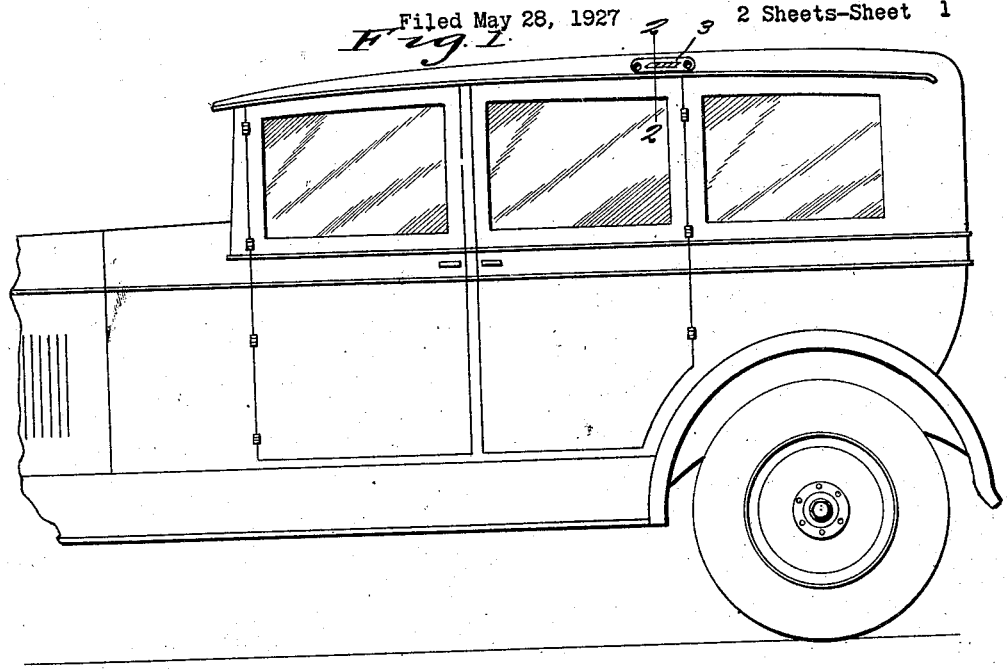
Figure 1 is a side view of a motor vehicle provided with my invention.

As shown in these drawings, the ventilator comprises a long narrow casing 1 having a central opening 2 in its lower side and having its ends open and frame members 3 covering the said ends, each member being held in place by bolts or the like passing through perforations 4 in the plate and through perforated ears 5 formed at the edges of the casing. Each member 3 is provided with an opening 6 and a plurality of plates 7 is arranged in said opening at an angle of 45° from the vertical and each plate 7 extends at an angle of 60° from the inner side of the frame member to the outer side thereof. Thus these plates will permit air to pass from the ventilator casing 1 but will prevent rain or snow from entering the casing and they will also act to prevent wind from blowing into the casing.

Figure 2:
Figure 2 is a section on line 2—2 of Figure 1.
Figure 3:
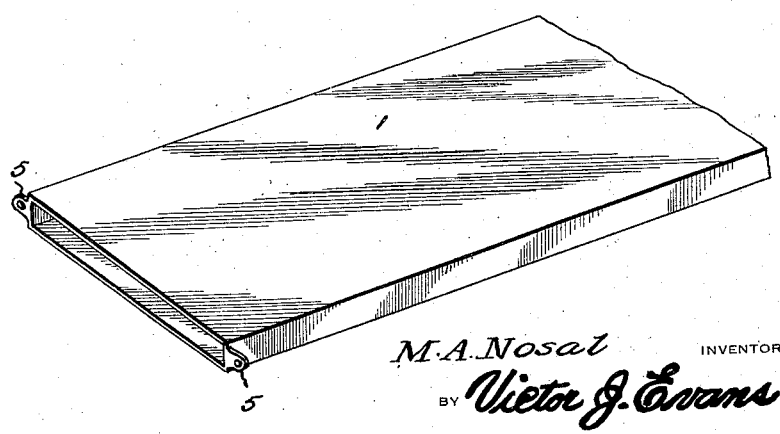
Figure 3 is a perspective view of a portion of the ventilator.

The casing is placed in the ceiling of the vehicle between the lining and the top of the vehicle and has its ends extending through holes formed in the top, as shown in Figures 1 and 2. A hole is cut in the lining to register with the hole 2 in the lower side of the casing and then a grid plate 9 is fastened to the casing to cover the hole, this plate also acting to clamp the lining to the casing, as shown in Figures 4 and 6.

A pair of baffle plates 10 is placed in the casing, one on each side of the hole 2 and the plates of each pair extend at a 45° angle toward the outer end of the casing, with one plate slightly in advance of the other so that an opening 11 is left between the plates of each pair. These plates form wind breaks and act to prevent any wind that enters the casing by the plates 7 from passing through the opening 2 into the vehicle.

From the foregoing it will be seen that I have provided a simple form of ventilator which will act to draw any gases or foul air from the interior of the vehicle, while preventing drafts from occurring in the vehicle, as the plates 10 and the plates 7 act to prevent wind from passing through the ventilator into the vehicle.

This device will prevent injury to the occupants of an automobile from carbon monoxide gas collecting in the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A ventilator for a vehicle comprising a casing adapted to be placed in the top of the vehicle and to extend through the sides of the top, said casing having an opening in its lower side communicating with the interior of the vehicle, frame members at the ends of the casing and plates in each frame member placed at an angle from the vertical and sloping rearwardly from the inner side of the frame member to the outer side thereof.

In testimony whereof I affix my signature.

MICHAEL A. NOSAL.